United States Patent
Zagorski et al.

(10) Patent No.: US 11,958,391 B2
(45) Date of Patent: Apr. 16, 2024

(54) SEAT ASSEMBLY AND SUPPORT PORTION

(71) Applicant: Lear Corporation, Southfield, MI (US)

(72) Inventors: Wu Pan Zagorski, Clawson, MI (US); Francesco Migneco, Saline, MI (US); Sajad Arabnejad, Ann Arbor, MI (US); Michelle A. Pereny, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/870,302

(22) Filed: Jul. 21, 2022

(65) Prior Publication Data
US 2024/0025314 A1   Jan. 25, 2024

(51) Int. Cl.
*A47C 7/46* (2006.01)
*B60N 2/64* (2006.01)
*B60N 2/66* (2006.01)

(52) U.S. Cl.
CPC .............. *B60N 2/6671* (2015.04); *A47C 7/46* (2013.01); *B60N 2/646* (2013.01)

(58) Field of Classification Search
CPC ........ B60N 2/646; B60N 2/66; B60N 2/7011; A47C 7/46
See application file for complete search history.

(56) References Cited

U.S. PATENT DOCUMENTS

| | | | |
|---|---|---|---|
| 5,823,620 A * | 10/1998 | Le Caz | B60N 2/6671 297/284.3 |
| 6,022,074 A * | 2/2000 | Swedenklef | B60N 2/2222 297/216.13 |
| 6,652,028 B2 | 11/2003 | McMillen | |
| 6,820,933 B2 | 11/2004 | Fereira Da Silva | |
| 7,137,664 B2 | 11/2006 | McMillen | |
| 9,119,473 B2 | 9/2015 | Kordyl | |
| 9,707,873 B2 | 7/2017 | Line | |
| 10,315,771 B1 * | 6/2019 | Rao | B64D 11/0647 |
| 10,391,902 B2 * | 8/2019 | Gonzalez Uribe | B60N 2/68 |
| 10,793,029 B2 | 10/2020 | Jung | |
| 2015/0080994 A1 * | 3/2015 | Ho | A47C 7/42 297/284.1 |

(Continued)

FOREIGN PATENT DOCUMENTS

| CN | 213849652 U | * | 8/2021 |
|---|---|---|---|
| CN | 115067702 A | * | 9/2022 |

(Continued)

*Primary Examiner* — Timothy J Brindley
(74) *Attorney, Agent, or Firm* — Fishman Stewart PLLC

(57) ABSTRACT

A support portion for a seat assembly includes, in some configurations, a first main portion and a second main portion disposed such that a gap is provided between the first main portion and the second main portion. In some configurations, the support portion includes a plurality of first extensions projecting from the first main portion away from the gap; the support portion includes a plurality of second extensions projecting from the second main portion away from the gap; the first main portion and the second main portion are configured to extend along opposite sides of a spine of a user such that the gap is aligned with said spine; and/or the plurality of first extensions and the plurality of second extensions are configured for connection with a seatback frame.

20 Claims, 8 Drawing Sheets

(56) References Cited

U.S. PATENT DOCUMENTS

| | | | | |
|---|---|---|---|---|
| 2015/0239381 | A1* | 8/2015 | Hamabe | B60N 2/39 297/313 |
| 2015/0367756 | A1* | 12/2015 | Katoh | B60N 2/22 297/285 |
| 2017/0101042 | A1* | 4/2017 | Zouzal | B60N 2/002 |
| 2018/0134191 | A1* | 5/2018 | Ketels | B60N 2/503 |

FOREIGN PATENT DOCUMENTS

| | | | | |
|---|---|---|---|---|
| DE | 202015000705 U1 * | 5/2015 | | A47C 7/405 |
| DE | 102016218158 A1 * | 3/2017 | | A61H 9/0078 |
| DE | 202019103460 U1 | 10/2020 | | |
| GB | 2579101 A * | 6/2020 | | A47C 7/405 |
| JP | 2019077437 A * | 5/2019 | | A47C 7/28 |
| KR | 20200066414 A * | 6/2020 | | |
| KR | 102506194 B1 * | 3/2023 | | |
| WO | WO-2017221175 A1 * | 12/2017 | | A47C 7/425 |

* cited by examiner

SEAT ASSEMBLY AND SUPPORT PORTION

TECHNICAL FIELD

The present disclosure generally relates to seat assemblies, including seat assemblies for vehicles, and support portions for seat assemblies.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assembly and/or support portion designs may be relatively complex and/or may not provide sufficient support to adequately and/or comfortably support a user of a seat assembly.

There is a desire for solutions/options that minimize or eliminate one or more challenges or shortcomings of seat assemblies and/or support portions. The foregoing discussion is intended only to illustrate examples of the present field and is not a disavowal of scope.

SUMMARY

In some embodiments, a support portion for a seat assembly includes a first main portion and a second main portion disposed such that a gap is provided between the first main portion and the second main portion, wherein the support portion includes a plurality of first extensions projecting from the first main portion away from the gap; the support portion includes a plurality of second extensions projecting from the second main portion away from the gap; the first main portion and the second main portion are configured to extend along opposite sides of a spine of a user such that the gap is aligned with said spine; and/or the plurality of first extensions and the plurality of second extensions are configured for connection with a seatback frame.

With some embodiments, a seat assembly includes a support portion and a seatback frame, wherein the support portion includes a first main portion and a second main portion disposed such that a gap is provided between the first main portion and the second main portion; the support portion includes a plurality of first extensions projecting from the first main portion away from the gap; the support portion includes a plurality of second extensions projecting from the second main portion away from the gap; the first main portion and the second main portion are configured to extend along opposite sides of a spine of a user such that the gap is aligned with said spine; the plurality of first extensions and the plurality of second extensions are configured for connection with the seatback frame; and/or the plurality of first extensions and the plurality of second extensions may be connected to the seatback frame.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
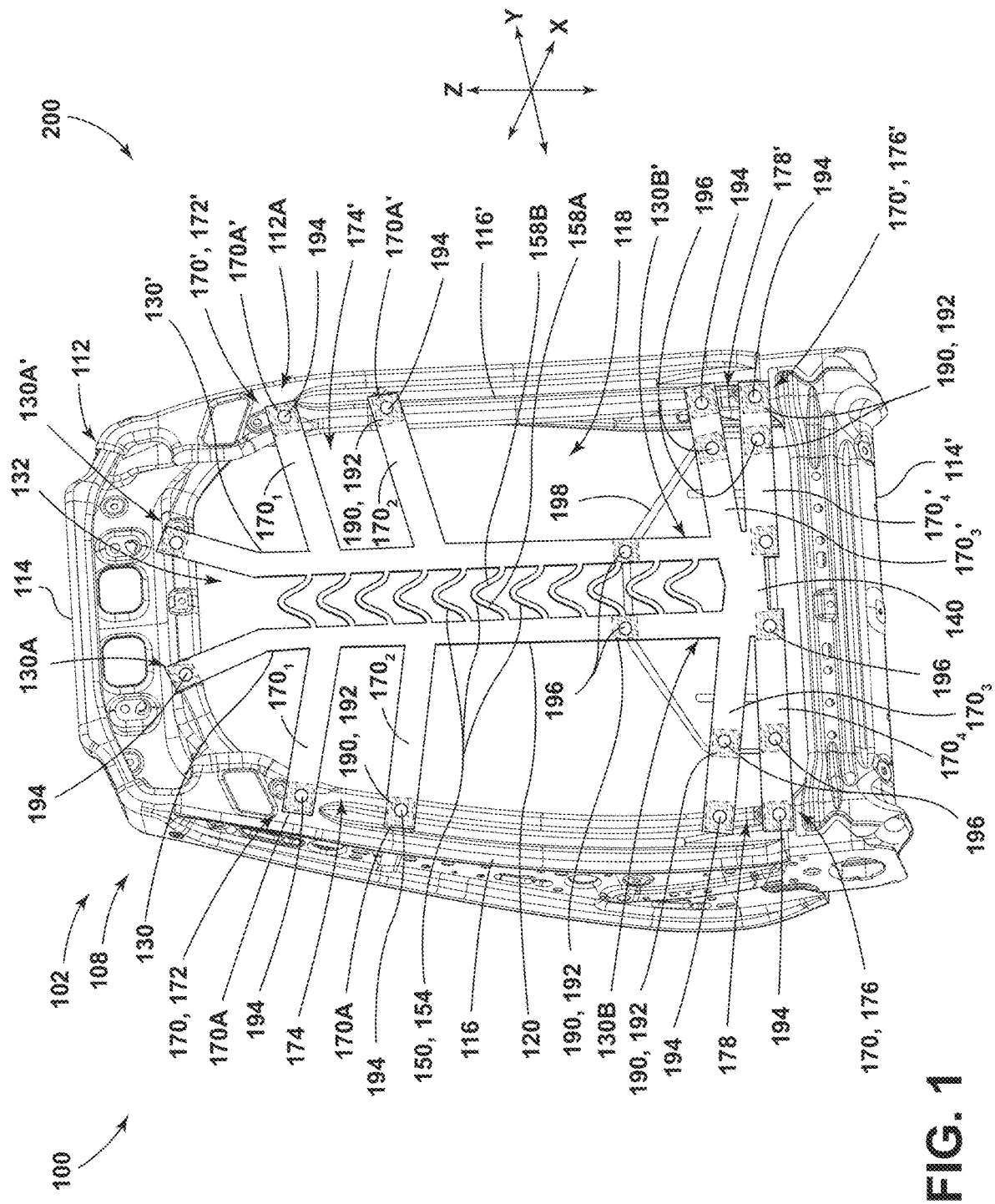
FIG. 1 is a perspective view generally illustrating an embodiment of a seat assembly according to teachings of the present disclosure.
Figure 7:
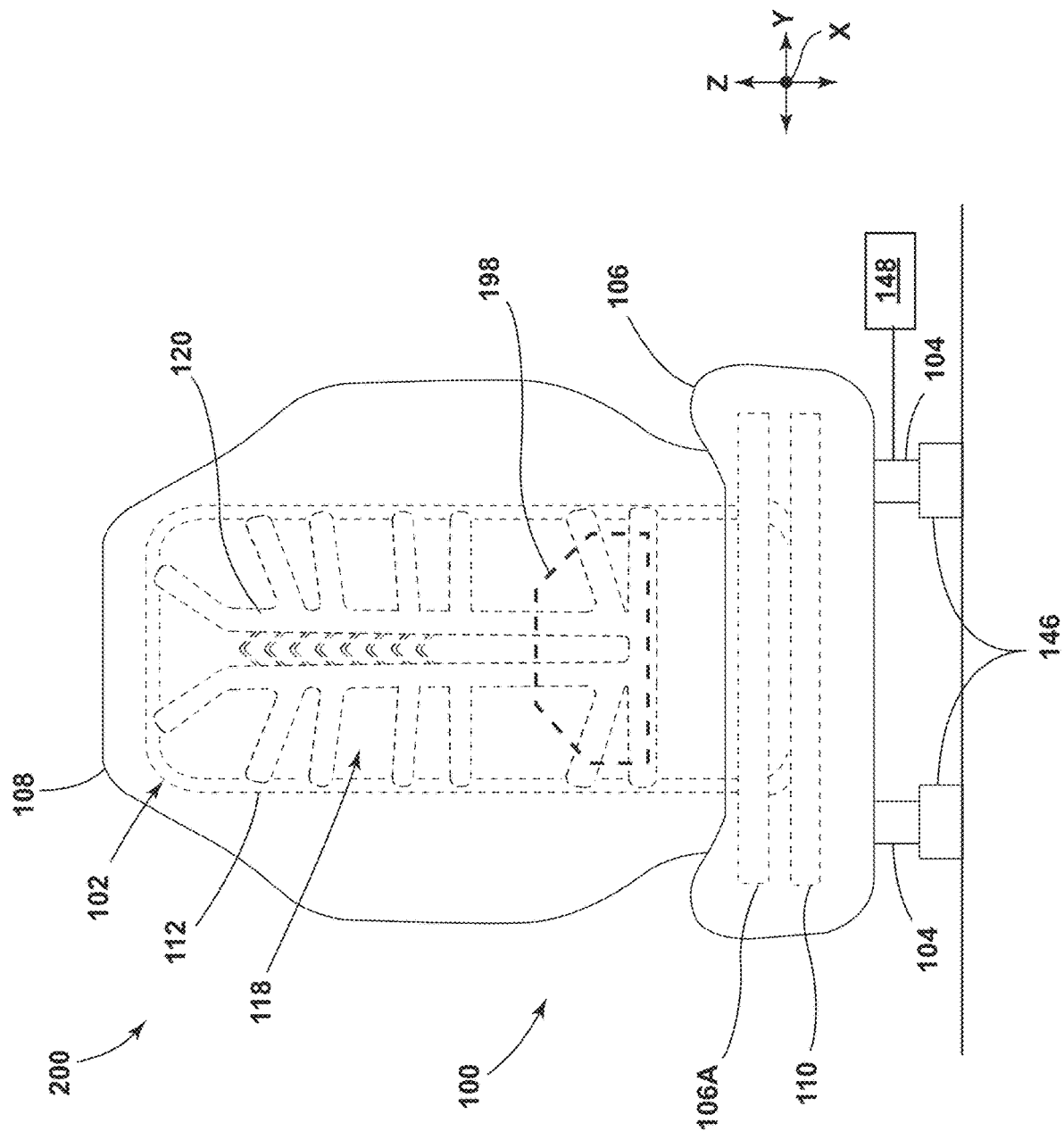
FIG. 7 is a front view generally illustrating an embodiment of a seat assembly according to teachings of the present disclosure.
Figure 8:
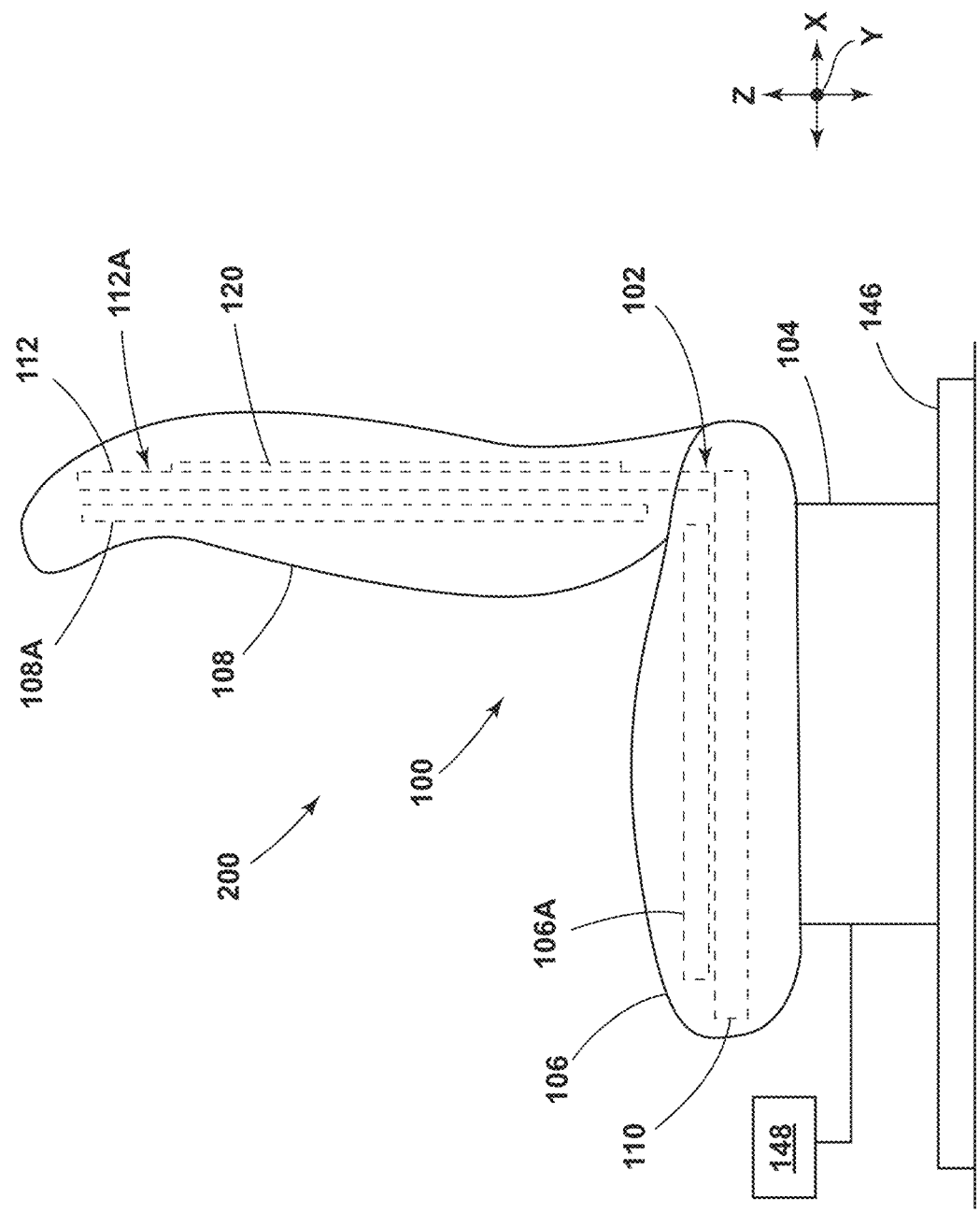
FIG. 8 is a side view generally illustrating an embodiment of a seat assembly according to teachings of the present disclosure.

In some embodiments, such as generally illustrated in FIGS. 1, 7, and 8, a seat assembly 100 is configured as a modular seat assembly that includes a plurality of components which, when assembled, form a vehicle seat, such as for a passenger vehicle 200 (e.g., cars, vans, SUVs, trucks, buses, trains, boats, ships, planes). The seat assembly 100 may be utilized in any other appropriate situation or apparatus, such as homes, office buildings, theaters, stadiums, recreational vehicles, commercial vehicles, and/or agricultural equipment, among others, and it not limited to vehicle applications.

In some embodiments, such as generally illustrated in FIGS. 7 and 8, a seat assembly 100 includes a seat frame 102, a seat base 104, a seat bottom 106, a seatback 108, one or more bladder assemblies 198, and/or a support portion 120. The seat frame 102 is connected to the seat base 104, which may be removably and/or slidably connected to a track assembly 146. The seat bottom 106 and/or the seatback 108 are connected to and/or supported by the seat frame 102. The seat frame 102, the seat bottom 106, and/or the seatback 108 may be configured to move relative to one another (e.g., adjust, recline, rotate, fold, collapse) and/or along the track assembly 146 via actuation of a seat adjuster 148. In embodiments, the seat bottom 106 and/or the seatback 108 may include one or more other elements, components, and/or assemblies, such as a pad or cushion 106A, 108A, a pad/cushion assembly, and/or a trim assembly. Additionally and/or alternatively, the seatback 108 may be connected to one or more other portions of the seat assembly 100 and/or one or more other portions of a vehicle 200.

In some embodiments, the seat frame 102 includes a seat bottom frame 110 (see, e.g., FIGS. 7 and 8) and a seatback frame 112 (see, e.g., FIGS. 1, 7, and 8). The seat bottom frame 110 is disposed in and/or connected to the seat bottom 106. The seatback frame 112 is disposed in and/or connected to the seatback 108. The seat bottom frame 110 and the seatback frame 112 are connected to one another via a connector, such as a bracket, a fastener, and/or a hinge. Alternatively, the seat frame 102, the seat bottom frame 110, and/or the seatback frame 112 may be collectively formed as a single, unitary component such that the seat frame 102 is a monolithic structure.

With some embodiments, such as generally depicted in FIGS. 1 and 7, the seatback frame 112 includes a plurality of cross-members (e.g., a first cross-member 114 and a second cross-member 114') and a plurality of side-members (e.g., a first side-member 116 and a second side-member 116'). A cross-member 114, 114' and/or a side-member 116, 116' may include one or more of a variety of configurations, such as a member, a beam, a bar, a rod, a tube, and/or an extension of the seatback frame 112. The cross-members 114, 114' may generally extend in a Y-direction, such as if/when the seatback is in a vertical, forward-facing position. The side-members 116, 116' may generally extend in a Z-direction (e.g., generally perpendicularly or obliquely relative to an X-Y plane), such as if/when the seatback is in a vertical, forward-facing position. The first and second cross-members 114, 114' extend between and connect opposite ends of the first and second side-members 116, 116' to define an opening 118. The opening 118 facilitates deformation of at least portions of the seatback that may occur when a force is applied thereto, such as when a user 300 sits on the seat assembly 100 and/or leans on the seatback 108. While the seatback frame 112 has a generally rectangular shape in the embodiment depicted in FIGS. 1 and 7, the seatback frame 112 may have other appropriate or desired shapes.

In some embodiments, such as generally depicted in FIGS. 1, 7, and 8, the seat assembly 100 includes a support portion 120 configured to support a user 300. The support portion 120 is flexible and deformable to compensate for an applied force, such as the weight of a user 300 sitting on the seat assembly 100 and/or leaning on the seatback 108. The support portion 120 is configured to limit (e.g., reduce) pressure on the spine 302 and/or one or more bones and/or bone prominences 306, 306', 308, 308', 310, 310' of a user 300 sitting on the seat assembly 100. The support portion 120 may be an alternative and/or substitute for a traditional wire suspension mat, which generally includes a plurality of metal wires. As such, in some embodiments, the seat assembly 100 does not include a wire suspension mat (see, e.g., FIGS. 1, 7, and 8).

Figure 2:
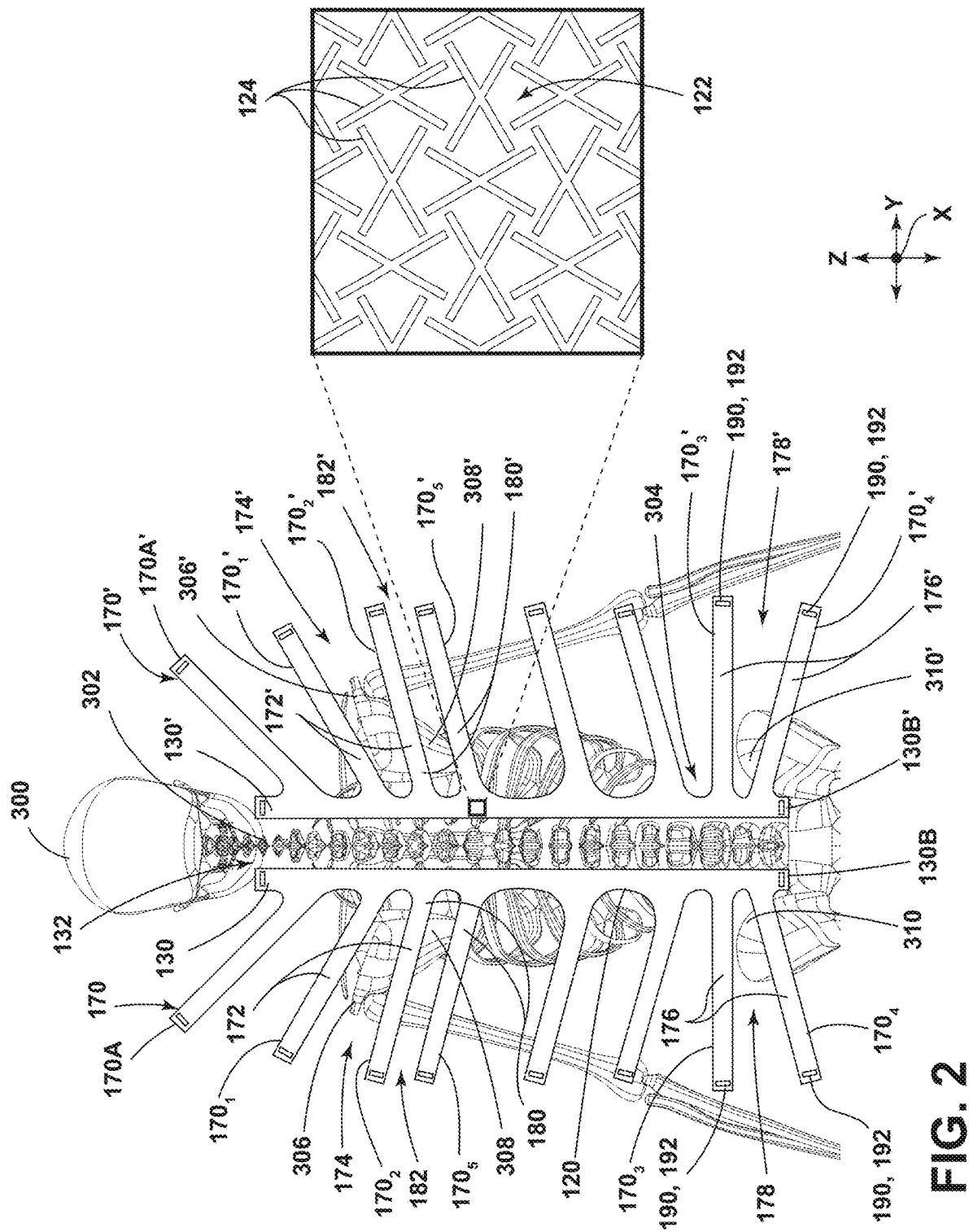
FIG. 2 is a rear view generally illustrating an embodiment of a support portion relative to a user according to teachings of the present disclosure.

In some embodiments, as generally illustrated in FIGS. 1 and 3-7, the support portion 120 is formed as a monolithic component. However, in other embodiments, the support portion 120 may include a plurality of individual separate portions that are connected to one another and/or the seatback frame 112 (see, e.g., FIG. 2). The support portion 120 and/or a material thereof may be porous and/or include a lattice structure or microarchitecture 122, which may include an array of X-shaped openings 124 (see, e.g., FIG. 2). The lattice structure 122 may, additionally and/or alternatively, have openings 124 of any other desired shape. The lattice structure 122 and/or the shape of the openings 124 may facilitate deformation (e.g., flexing, stretching) of the support portion 120 and may be configured in a variety of different ways to provide the support portion 120 with desired properties and/or characteristics. The support portion 120 includes and/or is composed of a composite plastic material. In other embodiments, the support portion 120 may include and/or be composed of other desired material(s) (e.g., metals, plastics, rubbers, foams) and/or may not have a lattice structure 122. In some embodiments, sections, areas, and/or regions of the support section 120 (e.g., a main portion 130, 130', an extension 170, 170', a lateral portion 140, a connecting portion 150, a mounting formation 190, a reinforced region 192) may have different lattice structure 122 and/or may be composed of different materials/structures to provide the sections, areas, and/or regions of the support portion 120 with different properties and/or characteristics.

In some embodiments, as generally illustrated in FIGS. 1, 7, and 8, the support portion 120 is disposed on and connected to the seat frame 102 (e.g., a rear surface 112A of the seatback frame 112 that faces away from a user 300). The support portion 120 extends partially or completely across the opening 118 of the seatback frame 112. The support portion 120 is disposed in the seatback 108 and may be connected to and/or supports one or more elements and/or components of the seat assembly 100 (e.g., a seatback cushion 108A, a distribution/ventilation mat). Additionally and/or alternatively, the support portion 120 may be disposed within the opening 118 and/or connected to a front surface of the seatback frame 112 that faces toward a user 300. In some embodiments, the support portion 120 may be disposed on and/or at least partially embedded within one or more elements and/or components of the seat assembly 100 (e.g., a seatback cushion 108A, a distribution/ventilation mat).

In some embodiments, such as generally depicted in FIGS. 1-6, the support portion 120 includes a first main portion 130 and a second main portion 130'. The main portions 130, 130' are longitudinal members having a generally rectangular cross-section in a X-Y plane if/when the seatback is in a vertical, forward-facing position. The main portions 130, 130' extend generally in a Z-direction (e.g., generally perpendicularly or obliquely relative to an X-Y plane) if/when the seatback is in a vertical, forward-facing position. While the support portion 120 in FIGS. 1-6 includes two main portions 130, 130', the support portion 120 may include other numbers of main portions 130, 130' and a main portion 130, 130' may have other appropriate or desired shapes.

In some embodiments, such as generally depicted in FIG. 1, the main portions 130, 130' are connected to the seatback frame 112. In some embodiments, such as those generally depicted in FIGS. 1 and 3-6, a first end 130A of the first main portion 130 and a first end 130A' of the second main portion 130' are connected to the first cross-member 114 of the seatback frame 112 via a respective connector/fastener 194. In some embodiments, such as generally depicted in FIGS. 1 and 3-6, the main portions 130, 130' may not connect and/or may not be configured to connect directly to the second cross-member 114'. In other embodiments, a second end 130B of the first main portion 130 and a second end 130B' of the second main portion 130' may be connected to the second cross-member 114' of the seatback frame 112 via a respective connector 194. In some embodiments, such as the one generally depicted in FIG. 2, the main portions 130, 130' may not directly connect and/or may not be configured to directly connect to the seatback frame 112 (e.g., may not directly connect to the first cross-member 114, nor the second cross-member 114') and may only be indirectly connected to the seatback frame 112 (e.g., via one or more extensions 170, 170'). In some embodiments, one or more main portions 130, 130' may be connected to another portion of the seatback frame 112 (e.g., the first or second side-members 116, 116') and/or another portion of the seat assembly 100 (e.g., the seatback cushion 108A, an air mover, a duct, a cable, among others).

In some embodiments, such as generally depicted in FIGS. 1-6, the first main portion 130 and the second main portion 130' are disposed adjacent to one another and spaced apart from one another to define a first gap 132 therebetween. In some embodiments, the first main portion 130 and the second main portion 130' generally extend obliquely relative to one another such that a width of the first gap 132 (e.g., extending generally in a Y-direction if/when the seatback is in a vertical, forward-facing position) varies (see, e.g., FIGS. 3 and 6). In other embodiments, the first main portion 130 and the second main portion 130' extend substantially parallel to one another, at least in some regions, such that the width of the first gap 132 is constant (see, e.g., FIGS. 1, 2, 4, and 5). In some embodiments, at least a portion of the first main portion 130 and/or the second main portion 130' extend substantially parallel to the first and/or second side-members 116, 116' and are spaced apart from the first and second side-members 116, 116' (see, e.g., FIG. 1). In some embodiments, the first main portion 130 and the second main portion 130', at least in some regions, are disposed closer to one another than to the first and/or second side-members 116, 116' (e.g., a width of the first gap 132 is smaller than a distance between the first main portion 130 and the first side-member 116 and a distance between the second main portion 130' and the second side-member 116').

In embodiments, such as generally depicted in FIGS. 1-6, the first main portion 130 and the second main portion 130' are configured to limit pressure on a spine 302 (and/or one or more bone prominences thereof) of a user 300 sitting on the seat assembly 100. The main portions 130, 130' are configured to extend along opposite sides of a user's spine 302 (e.g., generally in a Z-direction if/when the seatback is in a vertical, forward-facing position) such that the first gap 132 is aligned with the spine 302 of a user 300 sitting on the seat assembly 100 (see, e.g., FIG. 2). As such, the main portions 130, 130' are configured to minimize overlapping the user's spine 302 and/or to limit or eliminate the amount of pressure applied directly to the user's spine 302 by the support portion 120. One or more elements and/or components of the seat assembly 100 (e.g., the seatback cushion 108A, a distribution/ventilation mat) disposed over the first gap 132 may be able to deform to a greater extent than in areas disposed in alignment with the main portions 130, 130', which may in turn limit and/or reduce the amount of pressure applied to the user's spine 302. Additionally and/or alternatively, the first main portion 130 and the second main portion 130' may be configured to provide targeted support to the user's spine 302 to provide a more even distribution of pressure in the area of the spine 302 (and/or one or more bone prominences thereof) and thereby limit and/or reduce the amount of pressure applied to the user's spine 302.

In some embodiments, such as generally depicted in FIGS. 1-6, the first main portion 130 and the second main portion 130' are flexible and are configured to elastically deform (e.g., flex, stretch) upon application of a force to the support portion 120 (e.g., under the weight of a user 300 sitting on the seat assembly 100 and/or leaning against the seatback 108). In some embodiments, the main portions 130, 130' are configured to flex (e.g., in an X-direction and/or in a Y-direction if/when the seatback is in a vertical, forward-facing position) when a user 300 sits upon the seat assembly 100 and/or leans against the seatback 108 to cushion and support the user 300. In some examples, the first main portion 130 and the second main portion 130' are configured to flex away from one another, which may increase the width of the first gap 132 (at least in some regions) and further limit the amount of pressure applied to the user's spine 302. Additionally and/or alternatively, the first main portion 130 and the second main portion 130' may stretch when a user 300 sits upon the seat assembly 100 and/or leans against the seatback 108, which may facilitate a more localized deformation of the support portion 120. This in turn may facilitate the support portion 120 conforming to the shape of the user 300, cradling the user 300, and/or reduce pressure applied to the user's spine or other bone prominences, which may increase user comfort. For example, if/when the seatback is in a vertical, forward-facing position, the first main portion 130 and the second main portion 130' may stretch generally in a Y-direction, which may increase a width of the first and/or second main portion 130, 130', and/or may stretch generally in a Z-direction, which may increase a length of the first and/or second main portion 130, 130'. In some embodiments, the first main portion 130 and the second main portion 130' are more resistant to deformation and/or less deformable (e.g., less flexible, less stretchable) than one or more extensions 170, 170' and/or one or more connecting portions 150. Additionally and/or alternatively, the first main portion 130 and the second main portion 130' may be less resistant to deformation and/or more deformable (e.g., more flexible, more stretchable) than the lateral portion 140.

In some embodiments, such as generally depicted in FIGS. 1, 3, 4, and 6, the support portion 120 includes a lateral portion 140. The lateral portion 140 is configured to limit and/or restrict, at least to some extent, flexing of the main portions 130, 130' such as under a weight of a user 300. The lateral portion 140 is connected to the first main portion 130 and the second main portion 130', and extends across the first gap 132 (e.g., generally in a Y-direction if/when the seatback is in a vertical, forward-facing position). In some embodiments, the lateral portion 140 is connected at or about the second ends 130B, 130B' of the main portions 130, 130' and/or is disposed in a lumbar region 304 of a user 300. In some embodiments, the lateral portion 140 is more resistant to deformation and/or less deformable (e.g., less flexible, less stretchable) than one or more main portions 130, 130', one or more extensions 170, 170', and/or one or more connecting portions 150. While the embodiments generally depicted in FIGS. 1, 3, 4, and 6 include a single lateral portion 140, a support portion 120 may include other numbers of lateral portions 140 or may not include a lateral portion 140 (see, e.g., FIGS. 2 and 5).

In some embodiments, such as generally depicted in FIGS. 1 and 3-6, the support portion 120 includes one or more connecting portions/formations 150. The connecting portions 150 are configured to facilitate flexing of the first main portion 130 and the second main portion 130' (e.g., away from one another) and/or to provide support to a user's spine 302. The connecting portions 150 may also, in some situations (e.g., when fully extended and/or stretched), limit and/or restrict flexing of the first main portion 130 and the second main portion 130' at least to some extent. The connecting portions 150 are connected to the first main portion 130 and the second main portion 130', and extend across the first gap 132 (e.g., generally in a Y-direction). In some embodiments, the connecting portions 150 are disposed spaced apart from one another along the first main portion 130 and the second main portion 130' (e.g., generally in a Z-direction if/when the seatback is in a vertical, forward-facing position), at least in regions. In some embodiments, the connecting portions 150 are less resistant to deformation and/or more deformable (e.g., more flexible, more stretchable) than one or more main portions 130, 130', one or more extensions 170, 170', and/or the lateral portion 140. In some embodiments, the support portion 120 may include a single type of connector portion 150 (see, e.g., FIGS. 1 and 3-5) and/or may include multiple different types of connecting portions 150 (see, e.g., FIG. 6). While the embodiments generally depicted in FIGS. 1 and 3-6 include several connecting portions 150, a support portion 120 may include other numbers of connection portions 150 (e.g., a single connecting portion) or may not include connecting portions 150 (see, e.g., FIG. 2).

Figure 3:
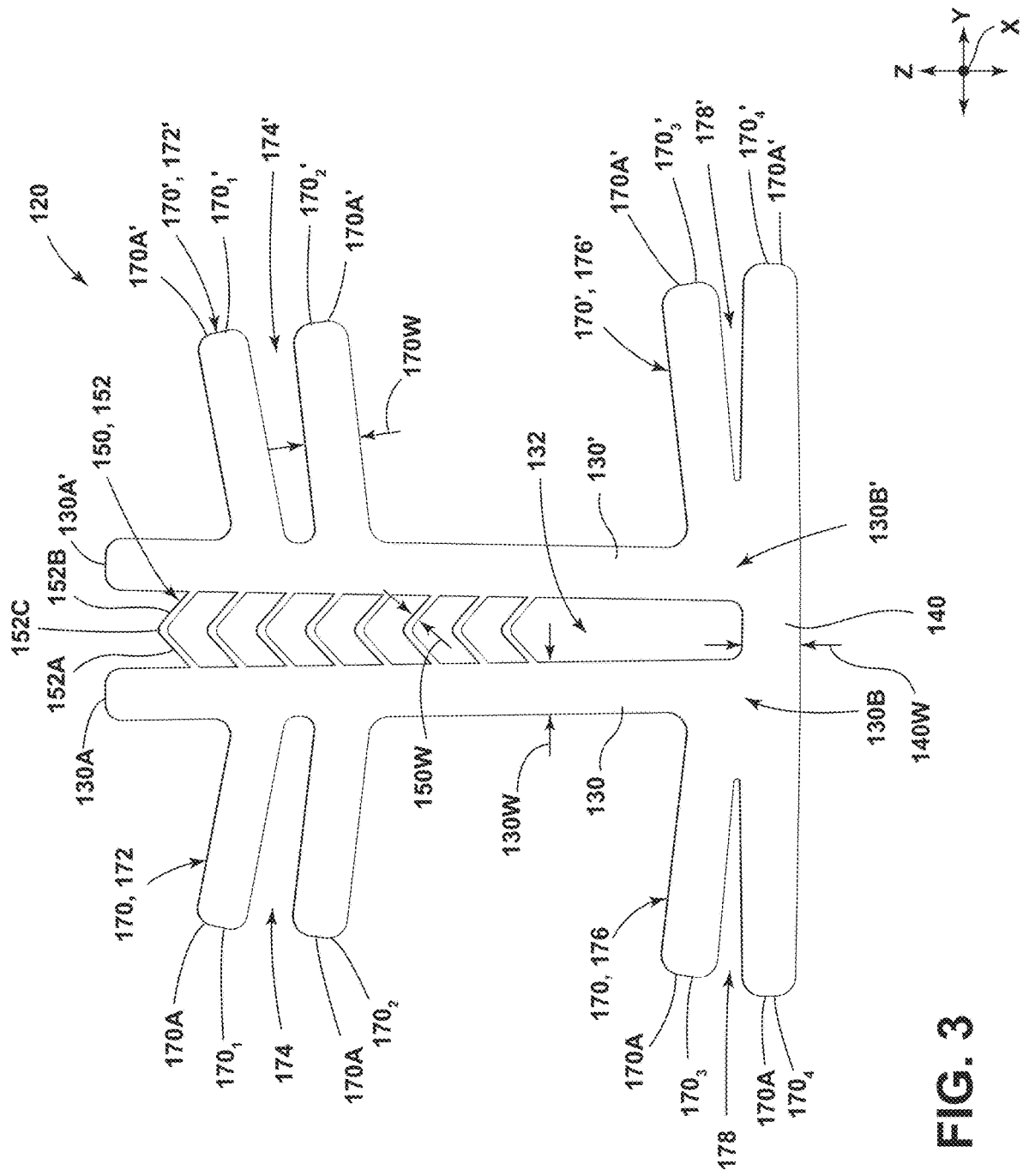
FIGS. 3 to 6 are front views generally illustrating embodiments of a support portion according to teachings of the present disclosure.
Figure 4:
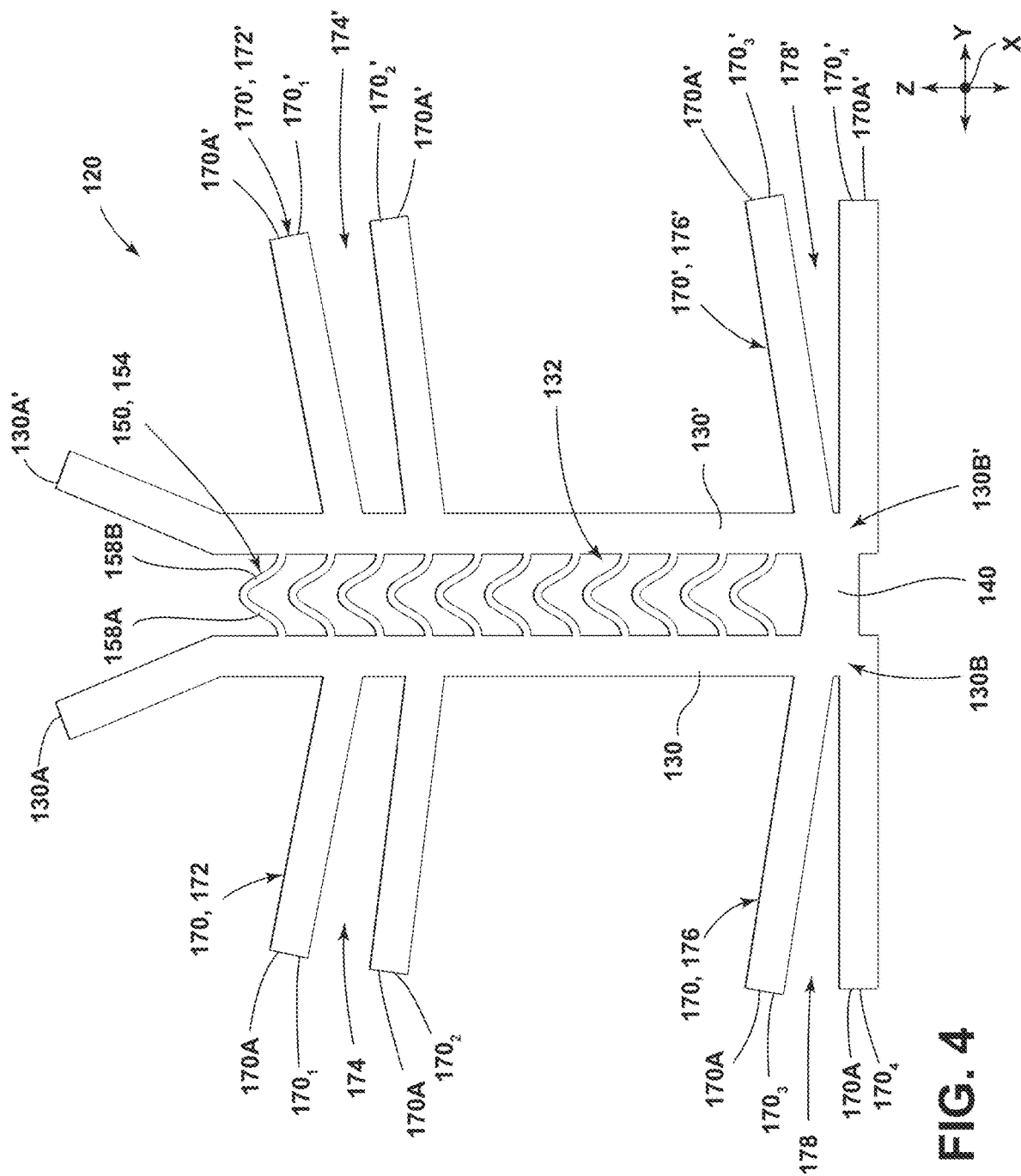
Figure 5:
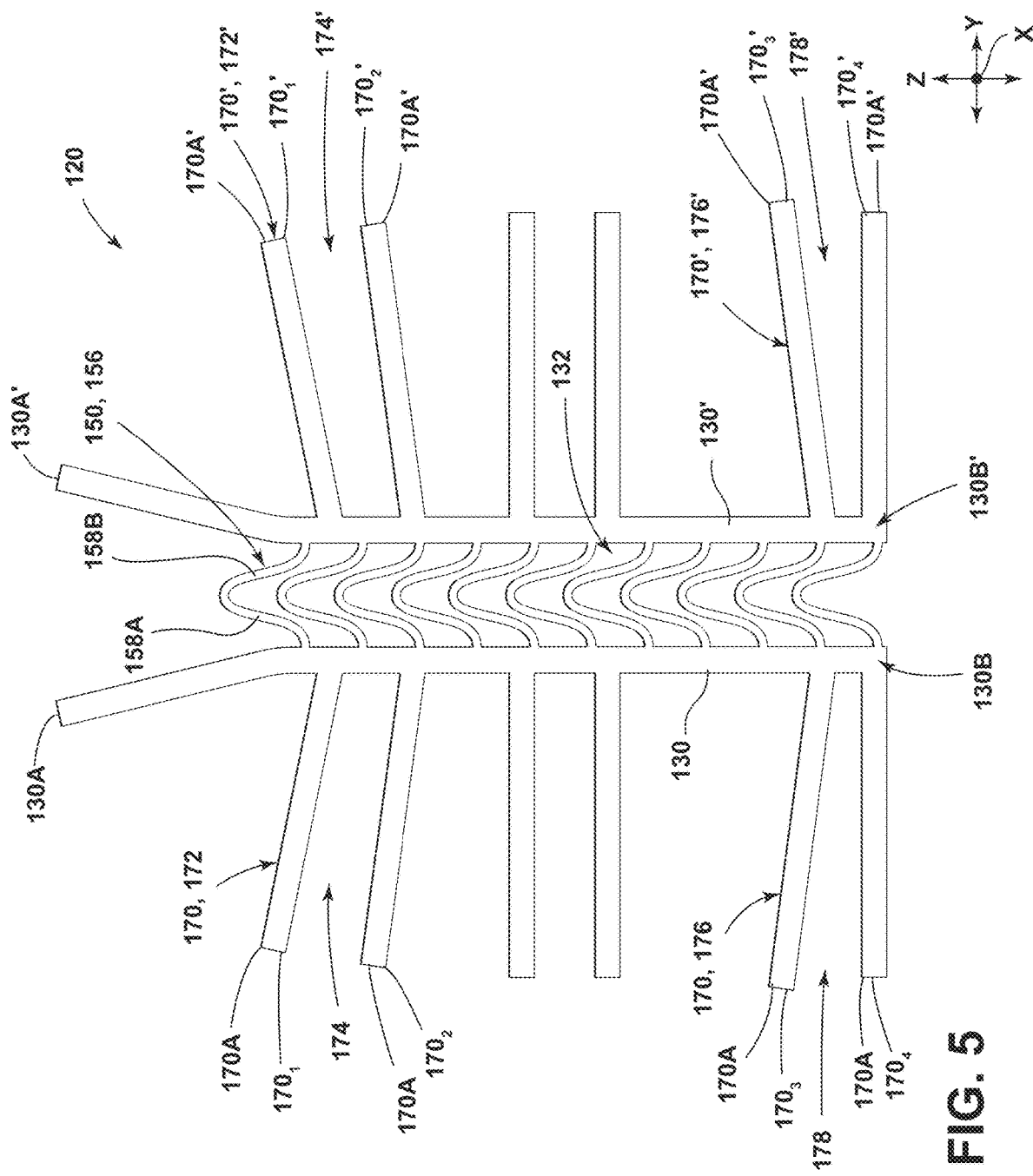
Figure 6:
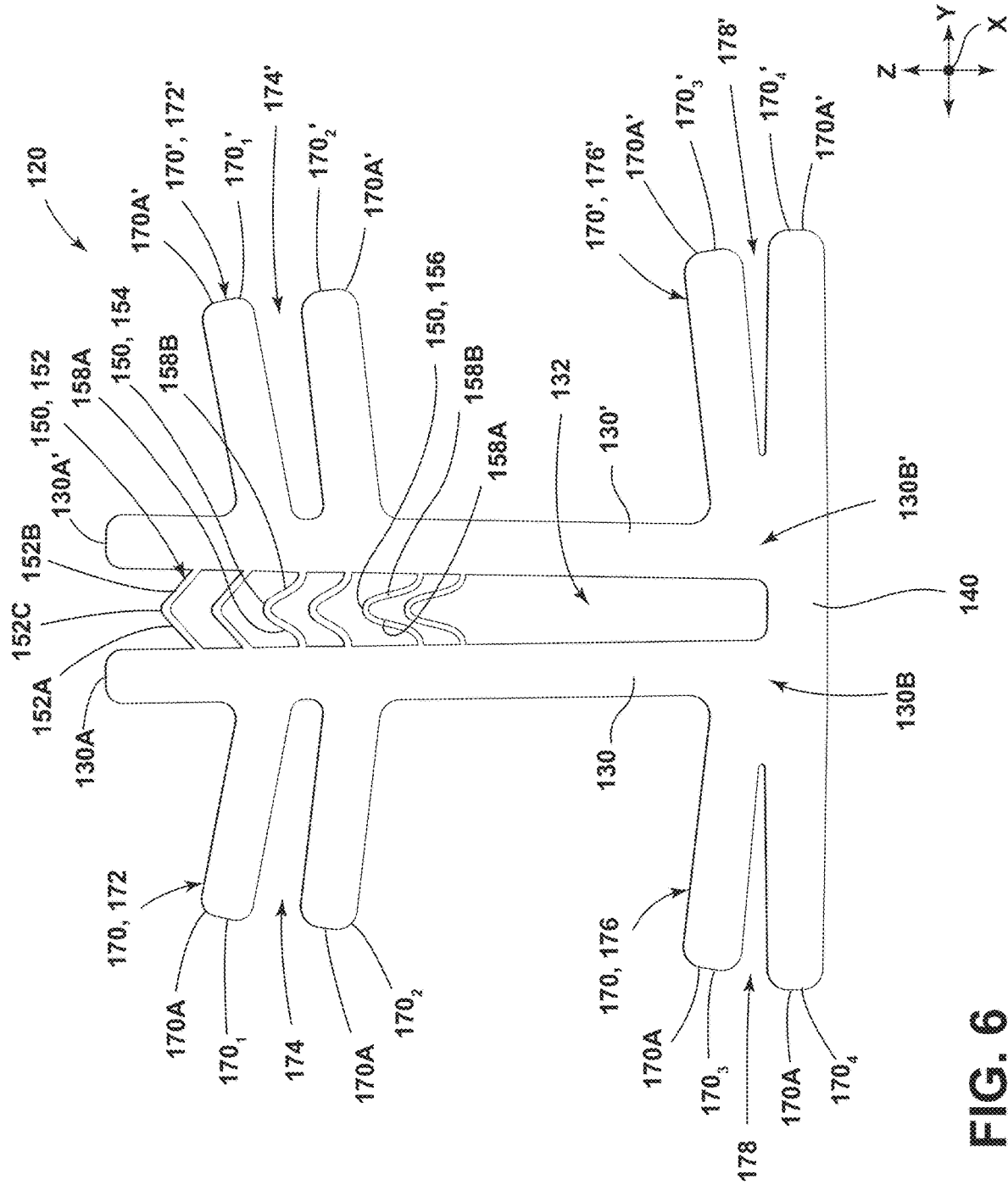

In some embodiments, such as generally depicted in FIGS. 1 and 3-6, the connecting portions 150 are generally V-shaped (which includes U-shaped configurations). In some embodiments, such as generally depicted in FIGS. 3 and 6, one or more connecting portions 150 (e.g., a first type of connecting portions 152) may have a first substantially linear portion 152A, a second substantially linear portion 152B, and a junction portion 152C connecting the first and second linear portions 152A, 152B such that, for example, the connecting portion 152 forms an inverted-V or chevron shape. In some embodiments, such as generally depicted in FIGS. 1, 4-6, one or more connecting portions 150 (e.g., a second type of connecting portions 154 in FIGS. 1, 4, and 6 and/or a third type of connecting portion 156 in FIGS. 5 and 6) may be curved and/or include one or more inflection points 158A, 158B. One or more connecting portions 150 (e.g., the second and third types of connecting portions 154, 156) may have two inflection points 158A, 158B such that the connecting portion 154, 156 forms a bell curve shape. The shape of a connecting portion 150 may impact its properties, characteristics, and/or performance. For example, the V-shape of the connecting portions 150 (e.g., the first, second, and third types of connecting portions 152, 154, 156) may facilitate deformation of the connecting portions 150 and/or flexing of the main portions 130. A connecting portion 150 including one or more linear portions 152A, 152B and/or one or more sharp angles (e.g., junction portion 152C), such as the first type of connecting portions 152, may be more rigid and/or more resistant to deformation than a connecting portion 150 that is curved, such as the second and third type of connecting portions 154, 156. A connecting portion 150 that has a lower peak (e.g., that is flatter), such as the second type of connecting portions 154, may be more rigid and/or more resistant to deformation than a connecting portion 150 that has a higher peak (e.g., that is taller and/or narrower), such as the third type of connecting portions 156.

In some embodiments, such as generally depicted in FIGS. 1-6, the support portion 120 includes a plurality of first extensions 170 and a plurality of second extensions 170'. The first extensions 170 and the second extensions 170' are substantially mirrored versions of each other relative to the first gap 132. Accordingly, embodiments of the first extensions 170 and the second extensions 170' are jointly described below. The first extensions 170 and the second extensions 170' are not limited to a mirrored configuration, and the first extensions 170 and the second extensions 170' may be configured identically to or differently from one another. The support portion 120 may also have other numbers of first extensions 170 and other numbers of second extensions 170'. While the support portion 120 includes the same number of first and second extensions 170, 170' in the embodiments of FIGS. 1-6, a support portion 120 may alternatively include a number of first extensions 170 that is different from the number of second extensions 170'.

In some embodiments, such as generally depicted in FIGS. 1-6, the extensions 170, 170' are longitudinal members having a generally rectangular cross-section in a X-Z plane if/when the seatback is in a vertical, forward-facing position. One or more of extensions 170, 170' may extend generally in a Y-direction (e.g., generally perpendicularly or obliquely relative to an X-Z plane). The extensions 170, 170' are connected (e.g., integrally) to and project from an associated main portion 130, 130'. The extensions 170, 170' are disposed spaced apart from one another along the associated main portion 130, 130' generally in a Z-direction if/when the seatback is in a vertical, forward-facing position. In some embodiments, one or more extensions 170, 170' may be disposed to be in alignment with a lumbar region 304 of a user 300 to increase user comfort and/or limit (e.g., reduce) back pain of the user 300. In some embodiments, one or more of the extensions 170, 170' may extend generally obliquely to one another (see, e.g., extensions $170_1$, $170_2$, extensions $170_3$, $170_4$, extensions $170_1'$, $170_2'$, and extensions $170_3'$, $170_4'$ in FIGS. 1-6) and/or the main portions 130, 130'. Additionally and/or alternatively, one or more of the extensions 170, 170' may extend substantially parallel to one another (see, e.g., extensions $170_2$, $170_5$ and extensions $170_2'$, $170_5'$ in FIG. 2). An end of each of the extensions 170, 170' opposite the respective main portion 130, 130' (e.g., a free end 170A, 170A') is connected to a side-member 116, 116' via a respective connector 194. Additionally and/or alternatively, one or more extensions 170, 170' may be connected to another portion of the seatback frame 112 (e.g., the first and/or second cross-member 116, 116') and/or another portion of the seat assembly 100 (e.g., the seatback cushion 108A).

In some embodiments, the extensions 170, 170' are disposed to limit/reduce pressure on one or more bone prominences (e.g., first shoulder bone prominences 306, 306', second shoulder bone prominences 308, 308', pelvic bone prominences 310, 310') of a user 300 sitting on the seat assembly 100. One or more of the extensions 170, 170' may be disposed to be offset from (e.g., not in alignment with) one or more bone prominences 306, 306', 308, 308', 310, 310' of a user 300 such that the bone prominences 306, 306', 308, 308', 310, 310' are disposed in alignment with one or more gaps 174, 174', 178, 178', 182, 182' between adjacent extensions 170, 170', which may enable one or more elements and/or components of the seat assembly 100 (e.g., a seatback cushion 108A, a distribution/ventilation mat) to deform to a greater extent than in areas disposed in alignment with an extension 170, 170'. This in turn may limit and/or reduce the amount of pressure applied to the bone prominences 306, 306', 308, 308', 310, 310' by the support portion 120 and/or other portions of the seat assembly 100. One or more of the extensions 170, 170' may be disposed to minimize overlapping with one or more bone prominences 306, 306', 308, 308', 310, 310' of a user 300 and to limit the amount of pressure applied directly to one or more bone prominences 306, 306', 308, 308', 310, 310' of a user 300 by the support portion 120. Additionally and/or alternatively, one or more of the extensions 170, 170' may be configured to provide targeted support to one or more areas surrounding and/or including one or more bone prominences 306, 306', 308, 308', 310, 310', which may provide a more even distribution of pressure in the area of the bone prominences 306, 306', 308, 308', 310, 310' and thereby limit and/or reduce a maximum/peak pressure applied to the bone prominences 306, 306', 308, 308', 310, 310'.

In some embodiments, such as generally depicted in FIGS. 1-6, the extensions 170, 170' are flexible and are configured to elastically deform (e.g., flex, stretch) upon application of a force to the support portion 120 (e.g., under the weight of a user 300 sitting on the seat assembly 100 and/or leaning against the seatback 108). One or more extensions 170, 170' are configured to flex (e.g., in an X-direction and/or in a Y-direction if/when the seatback is in a vertical, forward-facing position) when a user 300 sits upon the seat assembly 100 and/or leans against the seatback 108 to cushion and support the user 300. In some examples, one or more extensions 170, 170' are configured to flex away from and/or toward one or more other extensions 170, 170' to cushion and support the user 300 (e.g., extension $170_2$, $170_2$' may flex away from extension $170_1$, $170_1$' and toward extension $170_5$, $170_5$'). In some examples, the width of one or more gaps 174, 174', 178, 178', 182, 182' between adjacent extensions 170, 170' may increase, at least in some regions, when one or more extensions 170, 170' flex, which may further limit the amount of pressure applied to one or more bone prominences 306, 306', 308, 308', 310, 310'. Additionally and/or alternatively, one or more extensions 170, 170' may stretch when a user 300 sits upon the seat assembly 100, which may facilitate a more localized deformation of the support portion 120. This in turn may facilitate the support portion 120 conforming to the shape of the user 300 and/or cradling the user 300, which may increase user 300 comfort. For example, if/when the seatback is in a vertical, forward-facing position, one or more extensions 170, 170' may stretch generally in a Y-direction, which may increase a length of the extension 170, 170', and/or may stretch generally in a Z-direction, which may increase a width of the extension 170, 170', which may allow for additional movement of the main portions 130, 130' and/or reduce pressure on a user's spine. In some embodiments, one or more of the extensions 170, 170' are less resistant to deformation and/or more deformable (e.g., more flexible, more stretchable) than one or more main portions 130, 130' and/or the lateral portion 140. Additionally and/or alternatively, one or more of the extensions 170, 170' are more resistant to deformation and/or less deformable (e.g., less flexible, less stretchable) than one or more connecting portions 150. One or more extensions 170, 170' may be about as resistance to deformation and about as deformable as one or more connecting portions 150.

In some embodiments, such as generally depicted in FIGS. 1 and 3-6, the connecting portions 150 have a width 150W (e.g., perpendicular to a length and/or longitudinal extent of the connecting portion 150) that is smaller than a width 130W of the main portions 130, 130' (e.g., perpendicular to a length and/or longitudinal extent of the main portions 130, 130'; generally in a Y-direction), a width 170W of the extensions 170, 170' (e.g., perpendicular to a length and/or longitudinal extent of the extensions 170, 170'; generally in a Z-direction when the seatback is in a vertical, forward-facing position), and/or a width 140W of the lateral portion 140 (e.g., perpendicular to a length and/or longitudinal extent of the lateral portion 140; generally in a Z-direction if/when the seatback is in a vertical, forward-facing position), which may result in the connecting portions 150 being less resistant to deformation and/or more deformable (e.g., more flexible, more stretchable) than the main portions 130, 130', the extensions 170, 170', and/or the lateral portion 140. The width 140W of the lateral portion 140 may be larger than the widths 130W, 170W, 150W of the main portions 130, 130', the extensions 170, 170', and/or the connecting portions 150, which may result in the lateral portion 140 being more resistant to deformation and/or less deformable (e.g., less flexible, less stretchable) than the main portions 130, 130', the extensions 170, 170', and the connecting portions 150. In some embodiments, the width of the extensions 170, 170' is smaller than the width of the main portions 130, 130', which may result in the extensions 170, 170' being less resistant to deformation and/or more deformable (e.g., more flexible, more stretchable) than the main portions 130, 130'. In some examples, the widths 130W, 140W, 170W of the main portions 130, 130', the lateral portion 140, and the extensions 170 may be at least two or three times as wide as the width 150W of the connecting portions 150, but may have other widths.

In some examples, the support portion 120, in an unstressed position (e.g., when a user is not seated and/or prior to connection with a seatback frame 112), is substantially planar and/or parallel with a Y-Z plane when in a vertical configuration. Widths 130W, 140W, 170W may be significantly larger than the thickness of the support portion 120.

In some embodiments, such as generally depicted in FIG. 8, the main portions 130, 130', the lateral portion 140, the connecting portions 150, and the extensions 170, 170' each have substantially the same thickness (e.g., in an X-direction if/when the seatback is in a vertical, forward-facing position). In other embodiments, the thicknesses of the main portions 130, 130', the lateral portion 140, the connecting portions 150, and the extensions 170, 170' may not be equal, for example, to adjust the respective deformation resistance of the connecting portions 150, the main portions 130, 130', the extensions 170, 170', and/or the lateral portion 140 relative to one another.

In some embodiments, such as generally depicted in FIGS. 1-6, the extensions 170, 170' include one or more pairs of extensions (e.g., a first pair of first extensions 172, a second pair of first extensions 176, a third pair of first extensions 180, a first pair of second extensions 172', a second pair of second extensions 176', a third pair of second extensions 180'). A pair of extensions 172, 172', 176, 176', 180, 180' includes two extensions 170, 170' (see, e.g., extensions $170_1$, $170_2$, $170_3$, $170_4$, $170_5$ and extensions $170_1$', $170_2$', $170_3$', $170_4$', $170_5$' in FIG. 2) that are disposed adjacent to one another and spaced apart from one another generally in a Z-direction when the seatback is in a vertical, forward-facing position. The extensions 170, 170' of the pair of extensions 172, 172', 176, 176', 180, 180' may extend generally obliquely to one another (see, e.g., extensions $170_1$, $170_2$, extensions $170_3$, $170_4$, extensions $170_1$', $170_2$', extensions $170_3$', $170_4$' in FIGS. 1-6) and/or may extend parallel to one another (see, e.g., extensions $170_2$, $170_5$ and extensions $170_2$', $170_5$' in FIG. 2). In some embodiments, the support portion 120 includes a first pair of extensions 172, 172' that are configured to limit pressure on a first shoulder bone prominence 306, 306' of a user 300. The extensions $170_1$, $170_2$, $170_1$', $170_2$' of the first pair of extensions 172, 172' are disposed offset (e.g., not in alignment with) the first shoulder bone prominence 306, 306' of the user 300 such that, for example, a second gap 174, 174' between the first pair of extensions 172, 172' is disposed in alignment with the first shoulder bone prominence 306, 306'. In some embodiments, the support portion 120 includes a second pair of extensions 176, 176' that are configured to limit pressure on a pelvic bone prominence 310, 310' of a user 300. The extensions $170_3$, $170_4$, $170_3$', $170_4$' of the second pair of extensions 176, 176' are disposed offset (e.g., not in alignment with) the pelvic bone prominence 310, 310' of the user 300 such that, for example, a third gap 178, 178' between the second pair of extensions 176, 176' is disposed in alignment with the pelvic bone prominence 310, 310'. In some embodiments, the support portion 120 includes a third pair of extensions 180, 180' that are configured to limit pressure on a second shoulder bone prominence 308, 308' of a user 300. The extensions $170_2$, $170_5$, $170_2'$, $170_5'$ of the third pair of extensions 180, 180' are disposed offset (e.g., not in alignment with) the second shoulder bone prominence 308, 308' of the user 300 such that, for example, a fourth gap 182, 182' between the third pair of extensions 180, 180' is disposed in alignment with the second shoulder bone prominence 308, 308'.

In some embodiments, such as generally depicted in FIG. 1, the support portion 120 is connected directly to the seatback frame 112 via a plurality of connectors 194. However, a direct connection of the support portion 120 to the seatback frame 112 is not required and the support portion 120 may additionally and/or alternatively be indirectly connected to the seatback frame 112. The support portion 120 and/or one or more portions thereof may be connected (e.g., directly) to the seatback cushion 108A, the seat bottom frame 110, the seat bottom 106, and/or another portion of the seat assembly 100 in addition to and/or instead of the seatback frame 112. In some embodiments, the connectors 194 are configured as Christmas tree connectors. Additionally and/or alternatively, one or more of the connectors 194 (e.g., all of the connectors 194) may be configured as a rivet, a hook, a fastener, a clip, adhesive, a screw, a bolt, and/or other similar structure.

In some embodiments, such as generally depicted in FIG. 1, the support portion 120 and/or one or more portions thereof (e.g., a main portion 130, 130', an extension 170, 170') includes one or more mounting formations 190 configured to facilitate connection of the support portion 120 with one or more other elements and/or components (e.g., the seatback frame 112, the bladder assembly 198, the seatback cushion 108A, an air mover/fan, a duct, among others). In some embodiments, a mounting formation 190 may be configured as a reinforced region 192 that is stronger and/or has improved deformation resistance (e.g., via increased thickness and/or material properties). One or more elements and/or components (e.g., of the seat assembly 100) may be connected to a reinforced region 192 of the support portion 120, which may provide a stronger and/or more stable connection between the element/component and the support portion 120. In other examples, a mounting formation 190 may be configured as a receptacle, projection, and/or other structure that engages one or more elements and/or components of the seat assembly 100 (e.g., an air mover/fan, a duct, among others). In some examples, such as generally depicted in FIG. 1, the first main portion 130, the second main portion 130', and the extensions 170, 170' include one or more mounting formations 190 and/or one or more reinforced regions 192. The connectors 194 engage the reinforced regions 192 of the main portions 130, 130' and the extensions 170, 170' to provide a reinforced and/or stronger connection of the support portion 120 to the seatback frame 112. In some examples, a bladder assembly 198 (e.g., a lumbar bladder assembly) is connected (e.g., directly) to reinforced regions 192 of the main portions 130, 130' and several extensions 170, 170' via fasteners 196 such as clips, zip ties, adhesive, rivets, screws, nuts and bolts, and/or other similar structures.

In some embodiments, the seat bottom frame 110 may be configured and/or structured similarly to the seatback frame 112. The seat assembly 100 may include another support portion (e.g., a seat bottom support portion), which may be configured and/or structured similarly to the support portion 120. The seat bottom support portion may be connected to the seat bottom frame 110 and may function similarly to the support portion 120.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A support portion for a seat assembly, comprising:
   a first main portion;
   a second main portion disposed such that a gap is provided between the first main portion and the second main portion;
   a plurality of first extensions projecting from the first main portion away from the gap; and
   a plurality of second extensions projecting from the second main portion away from the gap;
   wherein the first main portion and the second main portion are configured to extend along opposite sides of a spine of a user such that the gap is aligned with said spine;
   the plurality of first extensions and the plurality of second extensions are configured for connection with a seatback frame;
   an end of the first main portion and an end of the second main portion are each configured to connect to a cross-member of said seatback frame;
   the plurality of first extensions each have a free end configured to be connected to a first side-member of said seatback frame; and
   the plurality of second extensions each have a free end configured to be connected to a second side-member of said seatback frame.

2. A seat assembly, comprising:
   a support portion including:
     a first main portion;
     a second main portion disposed such that a gap is provided between the first main portion and the second main portion;
     a plurality of first extensions projecting from the first main portion away from the gap; and
     a plurality of second extensions projecting from the second main portion away from the gap;
   a seatback frame that does not include a wire suspension mat;
   wherein the first main portion and the second main portion are configured to extend along opposite sides of a spine of a user such that the gap is aligned with said spine; and
   the plurality of first extensions and the plurality of second extensions are connected to the seatback frame.

3. The support portion of claim 1, wherein the first main portion and the second main portion are configured as longitudinal members that are configured to flex away from one another under a weight of said user to increase a width of the gap and cushion said user.

4. The support portion of claim 1, wherein the first main portion, the second main portion, the plurality of first extensions, and the plurality of second extensions include a material having a lattice and/or porous structure.

5. The support portion of claim 1, wherein the plurality of first extensions and the plurality of second extensions are configured to limit pressure on bone prominences of said user.

6. The support portion of claim 1, wherein at least some of the plurality of first extensions and at least some of the plurality of second extensions are configured to support a lumbar region of said user.

7. The support portion of claim 1, wherein:
   the plurality of first extensions includes a pair of first extensions;
   the pair of first extensions are disposed adjacent to one another;
   a second gap is provided between the pair of first extensions; and
   the pair of first extensions are configured to connect to said seatback frame such that the second gap is aligned with a shoulder prominence of said user to limit pressure on said shoulder prominence.

8. The support portion of claim 1, wherein at least one of the first main portion, the second main portion, the plurality of first extensions, and the plurality of second extensions includes a reinforced region configured for connection with one or more of an air bladder, a fan, a duct, said seatback frame, a cushion, and/or a cable.

9. The support portion of claim 1, comprising one or more bladders that are connected directly to at least one of the first main portion, the second main portion, the plurality of first extensions, and the plurality of second extensions.

10. The support portion of claim 1, including a lateral portion extending between and connecting the first main portion and the second main portion, wherein the lateral portion is configured to restrict, at least to some extent, flexing of the first main portion and the second main portion under a weight of said user.

11. The support portion of claim 10, wherein the lateral portion is disposed at or about ends of the first main portion and the second main portion configured to be disposed in a lumbar region of said user.

12. The support portion of claim 11, including a plurality of generally V-shaped connecting portions extending between and connecting the first main portion and the second main portion, wherein the plurality of connecting portions are more flexible than the lateral portion.

13. The support portion of claim 1, including a plurality of generally V-shaped connecting portions extending between and connecting the first main portion and the second main portion, wherein the plurality of connecting portions are configured to deform under a weight of said user to facilitate flexing of the first main portion and the second main portion away from one another to increase a width of the gap and cushion said user.

14. The support portion of claim 13, wherein the plurality of connecting portions are more flexible than the first main portion, the second main portion, the plurality of first extensions, and the plurality of second extensions.

15. The support portion of claim 13, wherein at least one connecting portion of the plurality of connecting portions includes:
   a first substantially linear portion extending from the first main portion;
   a second substantially linear portion extending from the second main portion; and
   a junction portion connecting the first substantially linear portion and the second substantially linear portion.

16. The support portion of claim 13, wherein at least one connecting portion of the plurality of connecting portions is curved and includes at least two inflection points such that the at least one connecting portion forms a bell curve shape.

17. The support portion of claim 13, wherein:
the plurality of connecting portions includes a first connecting portion and a second connecting portion;
each of the first connecting portion and the second connecting portion are curved and include at least two inflection points such that the first connecting portion and the second connecting portion each form a bell curve shape; and
the bell curve shape of the first connecting portion is taller and/or narrower than the bell curve shape of the second connecting portion.

18. The seat assembly of claim 2, wherein:
an end of the first main portion and an end of the second main portion are each connected to a cross-member of the seatback frame;
the plurality of first extensions each have a free end connected to a first side-member of the seatback frame; and
the plurality of second extensions each have a free end connected to a second side-member of the seatback frame.

19. The seat assembly of claim 2, wherein:
the seatback frame includes two side-members and at least one cross-member connecting the two side-members; and
the first main portion and the second main portion extend substantially parallel to the two side-members of the seatback frame.

20. A support portion for a seat assembly, comprising:
a first main portion;
a second main portion disposed such that a gap is provided between the first main portion and the second main portion;
a plurality of first extensions projecting from the first main portion away from the gap; and
a plurality of second extensions projecting from the second main portion away from the gap;
wherein the first main portion and the second main portion are configured to extend along opposite sides of a spine of a user such that the gap is aligned with said spine;
the plurality of first extensions and the plurality of second extensions are configured for connection with a seatback frame; and
the plurality of first extensions and the plurality of second extensions are configured to limit pressure on bone prominences of said user.

\* \* \* \* \*